US 009277258B2

(12) United States Patent
Oztaskent et al.

(10) Patent No.: US 9,277,258 B2
(45) Date of Patent: Mar. 1, 2016

(54) PROVIDING CORRELATED PROGRAMMING INFORMATION FOR BROADCAST MEDIA CONTENT AND STREAMING MEDIA CONTENT

(71) Applicant: Google Inc., Mountain View, CA (US)

(72) Inventors: Ant Oztaskent, Sutton (GB); Yaroslav Volovich, High Wycombe (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/866,626

(22) Filed: Apr. 19, 2013

(65) Prior Publication Data

US 2014/0317662 A1    Oct. 23, 2014

(51) Int. Cl.
| | | |
|---|---|---|
| *H04N 21/431* | (2011.01) | |
| *H04N 21/254* | (2011.01) | |
| *H04N 21/41* | (2011.01) | |
| *H04N 21/422* | (2011.01) | |
| *H04N 21/436* | (2011.01) | |
| *H04N 21/438* | (2011.01) | |
| *H04N 21/4402* | (2011.01) | |
| *H04N 21/458* | (2011.01) | |

(Continued)

(52) U.S. Cl.
CPC ......... *H04N 21/254* (2013.01); *H04N 21/4126* (2013.01); *H04N 21/42224* (2013.01); *H04N 21/431* (2013.01); *H04N 21/4312* (2013.01); *H04N 21/4316* (2013.01); *H04N 21/4383* (2013.01); *H04N 21/43615* (2013.01); *H04N 21/440218* (2013.01); *H04N 21/458* (2013.01); *H04N 21/4622* (2013.01); *H04N 21/4821* (2013.01)

(58) Field of Classification Search
CPC ............ H04N 21/431; H04N 21/4312; H04N 21/4316
See application file for complete search history.

(56) References Cited

U.S. PATENT DOCUMENTS

| | | |
|---|---|---|
| 7,707,614 B2 | 4/2010 | Krikorian et al. |
| 7,899,915 B2 | 3/2011 | Reisman |

(Continued)

FOREIGN PATENT DOCUMENTS

WO    WO2012129762    10/2012

OTHER PUBLICATIONS http://en.wikipedia.org/wiki/Hybrid_Broadcast_Broadband_TV pp. 1-7.

(Continued)

*Primary Examiner* — Robert Hance
(74) *Attorney, Agent, or Firm* — Lowenstein Sandler LLP (57) ABSTRACT

Systems and methods are disclosed for providing correlated programming information for broadcast media content and streaming media content. In one implementation, a processing device receives first programming information, the first programming information including scheduling information for media content originating at a first source. The processing device generates, based on media content originating at a second source, second programming information, the second programming information including scheduling information for the media content originating at the second source. The processing device correlates the second programming information with the first programming information. The processing device provides, at an interface, (a) the first programming information and (b) the second programming information as correlated with the first programming information.

19 Claims, 6 Drawing Sheets

(51) Int. Cl.
*H04N 21/462* (2011.01)
*H04N 21/482* (2011.01)

(56) References Cited

U.S. PATENT DOCUMENTS

| | | | |
|---|---|---|---|
| 8,176,432 B2 | 5/2012 | Klein et al. | |
| 8,320,901 B2 | 11/2012 | Klein et al. | |
| 8,385,721 B2 | 2/2013 | Huber et al. | |
| 8,707,357 B1* | 4/2014 | Sie | G06Q 20/40 725/38 |
| 2003/0156826 A1* | 8/2003 | Sonoda | H04N 5/782 386/296 |
| 2006/0174269 A1* | 8/2006 | Hansen-Turton | H04N 5/44543 725/39 |
| 2008/0022310 A1* | 1/2008 | Poling | H04N 5/44543 725/46 |
| 2008/0263596 A1* | 10/2008 | Kim | G06Q 30/0271 725/40 |
| 2010/0064331 A1 | 3/2010 | Cooper | |
| 2010/0257561 A1* | 10/2010 | Maissel | H04N 5/44543 725/41 |
| 2011/0041153 A1 | 2/2011 | Simon et al. | |
| 2011/0209167 A1* | 8/2011 | Yamamoto | H04N 21/4882 725/9 |
| 2011/0209177 A1 | 8/2011 | Sela et al. | |
| 2012/0240142 A1 | 9/2012 | Rose | |
| 2012/0242526 A1 | 9/2012 | Perez et al. | |
| 2013/0014138 A1 | 1/2013 | Bhatia et al. | |
| 2014/0006951 A1* | 1/2014 | Hunter | H04H 60/31 715/719 |

OTHER PUBLICATIONS

International Search Report and Written Opinion dated May 29, 2014 for PCT/US14/34721.

* cited by examiner

| Channel # | Channel Name | 10:00 | 10:30 | 11:00 | 11:30 | |
|---|---|---|---|---|---|---|
| 1 | Cable Sports Channel | Basketball Game (live) 10:00pm – 11:00pm Eagles vs. Tigers Category: Sports - Basketball | | Sports Highlights 11:00pm – 11:30pm Top plays of the day Category: Sports - Highlights | | (Broadcast Media Channel) |
| 2 | Sports Video Channel | Little League Baseball Game 10:00pm – 10:40pm Johnny's first game!! Category: Sports – home videos | Football Tips 10:40pm – 11:00pm Passing advice Category:.... | College Basketball Greats 11:00pm – 11:30pm Best players of all time Category: Sports - Basketball | | (Streaming Media Channel) |
| 3 | News Channel | Newsroom (live) 10:00pm – 11:30pm Today's news Category: News | | | | (Broadcast Media Channel) |
| 4 | Basketball 24/7 | Basketball Game (live) 10:00pm – 11:00pm Eagles vs. Tigers Category: Sports – Basketball Source: Cable Sports Channel | | College Basketball Greats 11:00pm – 11:30pm Best players of all time Category: Sports – Basketball Source: Sports Video Channel | | (Composite Channel) |

PROVIDING CORRELATED PROGRAMMING INFORMATION FOR BROADCAST MEDIA CONTENT AND STREAMING MEDIA CONTENT

TECHNICAL FIELD

Aspects and implementations of the present disclosure relate to data processing, and more specifically, providing correlated programming information for broadcast media content and streaming media content.

BACKGROUND

Video content can be stored on data servers and provided to users for viewing over the Internet. Applications for supporting the viewing of such video content may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives first programming information, the first programming information including scheduling information for media content originating at a first source. The processing device generates, based on media content originating at a second source, second programming information, the second programming information including scheduling information for the media content originating at the second source. The processing device correlates the second programming information with the first programming information. The processing device provides, at an interface, (a) the first programming information and (b) the second programming information as correlated with the first programming information.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to providing correlated programming information for broadcast media content and streaming media content. The systems and methods disclosed can be applied to broadcast media content (such as network or cable television stations and/or programs) and streaming media content (e.g., video clips or content, such as those hosted on video sharing/streaming websites or servers), as well as to various devices such as televisions (TVs), set-top boxes (STBs), and media players that are capable of receiving, displaying, or otherwise providing various types of media content. More particularly, while much broadcast media content (such as network or cable television programs) is available to users in a linear or sequential format (as reflected, for example, in the programming schedule for a given television channel where different programs are scheduled for different times of the day/week, etc.), streaming media content (such as video clips hosted on video streaming websites or servers) is available to users in a non-linear, 'on-demand' format (whereby the user can select when to view a particular video). However, in light of the fact that a user may wish to view both broadcast media content (e.g., TV programs) and streaming media content (e.g., video clips available via the Internet) on a single device (such as a home TV), it can be advantageous, in certain scenarios, to generate and provide an interface to the user that provides programming information for both broadcast media content and streaming media content in a uniform and/or comparable format.

Accordingly, described herein in various embodiments are technologies that enable programming information (such as scheduling information) to be generated for streaming media content. In doing so, the generated streaming media programming information can be provided to a user in conjunction with broadcast media programming information (e.g., the programming schedule for a network or cable television channel) at a unified interface, thereby enabling the user to consider programming options from both broadcast and streaming sources and to transition between such sources in a seamless fashion (e.g., by changing the channel, such as from a broadcast media channel to a streaming media channel). Additionally, being that such programming information can be provided at a unified interface, such an interface (provided, for example, within a mobile application executing on a mobile device such as a smartphone) can serve as a single, universal controller (such as a remote control) to control the operation of the various devices (e.g., TV, STB, media player, etc.) that provide the various types of media content. Moreover, the various communication protocols that can be used to provide instructions to such devices can be detected and selectively utilized by the mobile application to provide appropriately configured instructions to each device. It should be noted that while aspects and implementations of the present disclosure are largely described with respect to video content (e.g., broadcast video content such as television programs and streaming media content such as Internet video clips), the techniques disclosed are applicable to any other media type, including audio (e.g., broadcast audio content such radio programming, streaming audio content such as Internet audio clips), etc.

Figure 1:
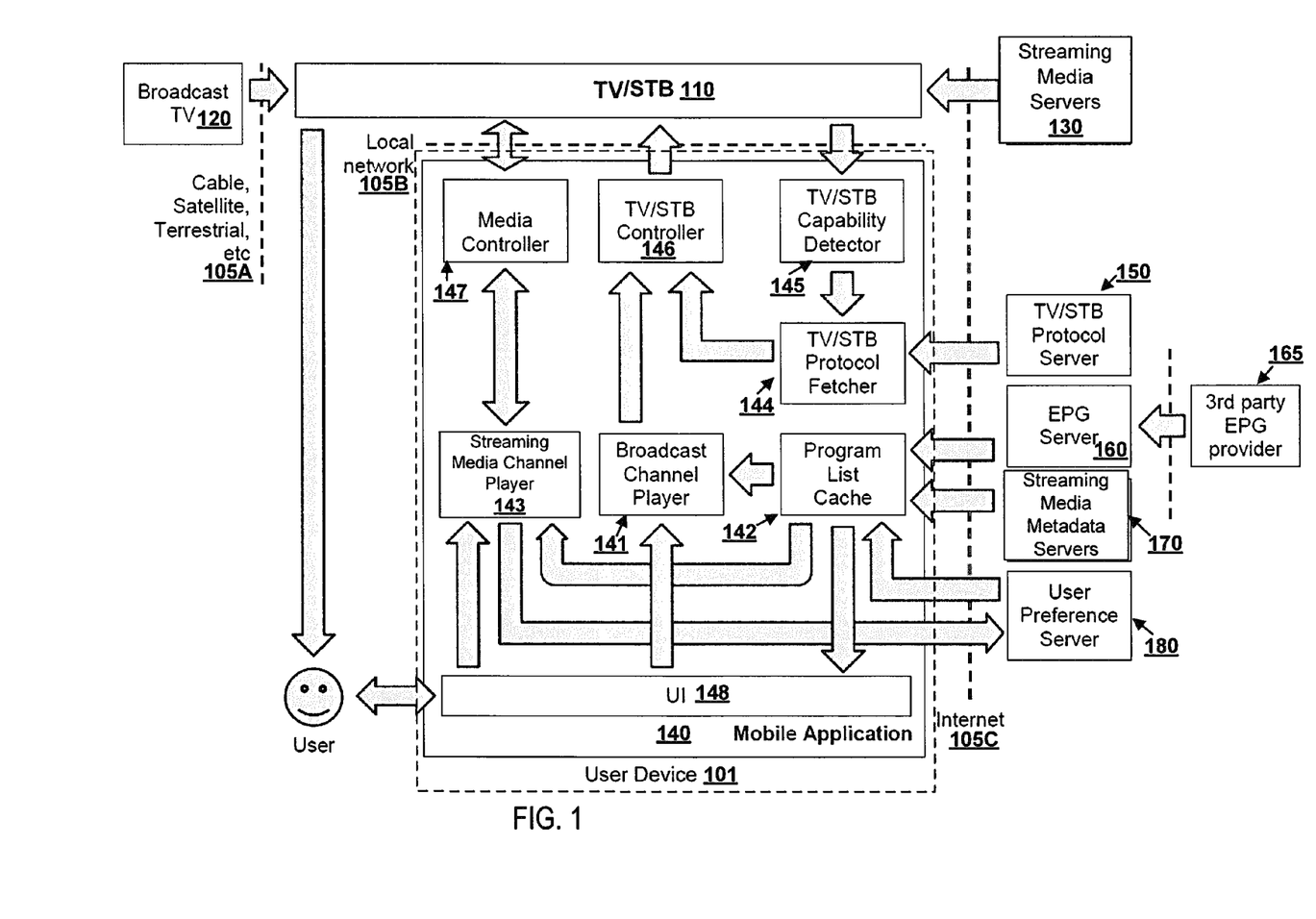
FIG. 1 depicts an illustrative system architecture, in accordance with one implementation of the present disclosure.

FIG. 1 depicts an illustrative system architecture 100, in accordance with one implementation of the present disclosure. The system architecture 100 includes a user device 101, a television/set-top box (TV/STB) 110, a broadcast media source 120, a streaming media source 130 and various servers 150, 160, 165, 170, and 180. These various elements or components can be connected to one another via any number of networks 105A, 105B, and 105C, such as a public network (e.g., the Internet), a private network (e.g., a local area network (LAN) or wide area network (WAN)), or a combination thereof.

User device 101 can be a mobile device such as a smartphone, tablet, notebook computer, or any other such computing device capable of executing mobile application 140. Mobile application 140 can include various components 141-148. Such components can be combined together or separated in further components, according to a particular implementation. It should be noted that in some implementations, various components of mobile application 140 may run on separate machines. Moreover, some operations of certain of the components are described in more detail below with respect to FIG. 2.

TV/STB capability detector 145 can detect or otherwise identify TVs, STBs, and/or or any other devices such as media projection devices (e.g., audio equipment) that are connected to or otherwise accessible from a network (such as local network 105B), such as using a device discovery technique such as Simple Service Discovery Protocol (SSDP), Discover and Launch (DIAL), etc. In doing so, any number of characteristics or capabilities of devices such as TV/STB 110 can be identified, such as the manufacturer and/or model number of the device(s), etc.

Having identified a particular TV/STB 110 (such as via TV/STB capability detector 145), TV/STB protocol fetcher 144 can request or otherwise obtain a protocol-file for the identified TV/STB 110, such as from a server such as TV/STB protocol server 150 (which can, for example, store control protocols for various TV/STB brands and/or models). In certain implementations, such a protocol-file can be a table including various remote control commands ('channel up,' 'channel down,' etc.) as well as binary data to be sent or transmitted to the TV/STB 110 in order to execute the corresponding command (e.g., to tune the TV/STB 110 to another channel). Alternatively, the protocol-file received from the server 150 can include a table including various remote control commands and corresponding Python (or any other such scripting language) functions to be executed in order to send or transmit a particular command to the TV/STB 110. For example, the protocol-file can indicate that in order to execute a 'program-up' command on TV/STB 110, the sendProgramUp( ) function is called. In such implementations the code of the sendProgramUp( ) function is included in the protocol-file, which can, for example, make an HTTP request to the TV/STB 110 and/or pass a hexadecimal code to an HTTP parameter that indicates that the command to be executed is 'program up.'

Mobile application 140 can also include TV/STB controller 146. TV/STB controller 146 can store one or more TV/STB control protocol(s), and can execute such protocol(s) to control any number of devices (such as those on the same network as or otherwise accessible or perceptible to user device 101, e.g., TV/STB 110). For example, upon receiving one or more commands from broadcast channel player 141 to send/transmit specific commands to TV/STB 110 (e.g., commands to tune TV/STB 110 to a particular broadcast TV channel), TV/STB controller 146 can identify the command(s) in the TV/STB protocol-file and determine one or more subsequent action(s) to be taken (e.g., to execute a Python function provided in the protocol-file, as described above). In doing so, the TV/STB 110 can be tuned to the required channel, for example.

Program List Cache 142 can receive data from any number of sources such as electronic program guide (EPG) server 160, streaming media metadata server(s) 170 and/or user preference server 180. From EPG server 160, program list cache 142 can receive data such as information/details (e.g., scheduling information, categories, program descriptions, etc.) pertaining to media content (e.g., television broadcast programs) that is being broadcast and/or that will be broadcast on various channels over a time period (e.g., over the next 24 hours), and can store such information locally at user device 101. In certain implementations, EPG server 160 stores EPG information received from a third party EPG data provider 165, and/or extracted from a TV signal (such as in accordance with Advanced Television Standards Committee (ATSC) or Digital Video Broadcasting (DVB) standards/specifications). Program list cache 142 can also periodically contact EPG server 160 to receive updates to such information/details.

Program list cache 142 can also receive data from streaming media metadata server(s) 170. In certain implementations, streaming media metadata server(s) 170 can store information (e.g., categories, descriptions, ratings, durations, etc.) associated with streaming media content such as streaming audio and/or streaming video. Thus, for example, program list cache 142 can receive a playlist of streaming media (e.g., a list or queue of videos associated with one another that can be played in a sequence) that a user (e.g., a user associated with user device 101) is subscribed to, as well as information (descriptions, categories, durations, etc.) associated with such media content. In certain implementations, such a playlist can be generated based on various characteristics and/or preferences associated with the user (e.g., media content that the user has previously viewed) and/or can be a previously defined channel (e.g., a streaming media channel which can contain multiple videos or playlists relating to a particular topic and which can be selected by a user in order to view an ongoing sequence of videos or playlists associated with the channel). It should be noted that in situations in which the systems discussed herein collect personal information about users, or may make use of personal information, the users may be provided with an opportunity to control whether programs or features collect user information (e.g., information about a user's media viewing history, profession, a user's preferences, or a user's current location), or to control whether and/or how to receive content such as media content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Program list cache 142 can also receive data from user preference server 180. User preference server 180 can store a media playback history for a particular user (e.g., a user associated with user device 101) and/or various channel number assignments associated with the user or users. For example, as described in detail herein, a user can assign various channel numbers to different channels (e.g., various streaming media and/or broadcast TV channels). In certain implementations, based on the assigned channel numbers, channels associated with media content originating from one source (e.g., streaming media content) can be arranged in relation to channels associated with media content originating from another source (e.g., broadcast media content). Moreover, based on the media playback history of a particular user, program list cache 142 can remove various media content items (e.g., streaming media content items such as videos) that the user has previously viewed or otherwise experienced.

Mobile application 140 can also include user interface (UI) 148. As described in detail herein and depicted, for example, in FIGS. 4 and 5, UI 148 can be displayed at user device 101, such as on a touchscreen input/output interface (not shown), and can provide, for example, a program list for some or all channels including broadcast media (e.g. TV) and streaming media (e.g., streaming video and/or audio) channels. The UI 148 can request and/or display data (e.g., scheduling information, program descriptions, etc.) from the program list cache 142, for example, corresponding to broadcast media content and/or streaming media content being provided in each of the channels. As described herein, a user may select a broadcast channel or a streaming media channel from UI 148, and, in doing so, provide an instruction to broadcast channel player 141 and/or streaming media channel player 143 to tune to/play the selected channel (i.e., to request and/or receive the selected content from a broadcast source such as broadcast TV 120 or a streaming media source such as streaming media servers 130).

Upon receiving an instruction from UI 148 to tune to a particular channel, broadcast channel player 141 can retrieve various channel details (such as the channel number) from program list cache 142 and instruct the TV/STB controller 146 to send or otherwise transmit the channel details to the TV/STB 110.

Upon receiving an instruction from UI 148 to tune to a particular channel (such as a streaming video channel), streaming media channel player 143 can retrieve various channel details such as a playlist or sequence for the channel from program list cache 142, and can further provide instructions to media controller 147, such as to play the first (or next) media content item (e.g., a video) in the sequence. Upon identifying that the playback of that media content item is completed, streaming media channel player 143 can instruct media controller 147 to play the next media content item in the sequence, and so on. Additionally, in certain implementations, upon identifying that the playback of a media content item (e.g., a video) is completed, streaming media channel player 143 can update the media playback history of a particular user in user preference server 180 (thereby preventing the same media content item from subsequently being loaded into program list cache 142 for the same user).

Media controller 147 can coordinate the display/presentation of media content (such as at TV/STB 110) in accordance with any number of specifications/protocols, including but not limited to Universal Plug and Play (UPnP), Digital Living Network Alliance® (DLNA) (such as by configuring user device 101 as a Digital Media Controller or DMC), Discovery and Launch (DIAL) and/or any other such media delivery specification/protocol. Accordingly, media controller 147 can, for example, transmit or otherwise provide instructions to TV/STB 110 via the DLNA protocol to display or otherwise present one or more content items (e.g., one or more streaming videos, such as those stored on streaming media server(s) 130), and such content items can be received from streaming media server(s) 130 at TV/STB 110 (such as via a network such as Internet 105C) and decoded/presented on the TV/STB 110.

It should be noted that in certain implementations, a particular TV/STB model may not support or otherwise be capable of directly presenting a particular media format (e.g., a streaming video format) provided by streaming media servers 130. In such a scenario (e.g., upon determining such incompatibility), media controller 147 can transcode the media content provided by media servers 130, and provide the transcoded media content to the TV/STB 110. In doing so, even media content that cannot be received by TV/STB 110 directly from streaming media servers 130 can still be presented on the TV/STB via media controller 147.

Figure 2:
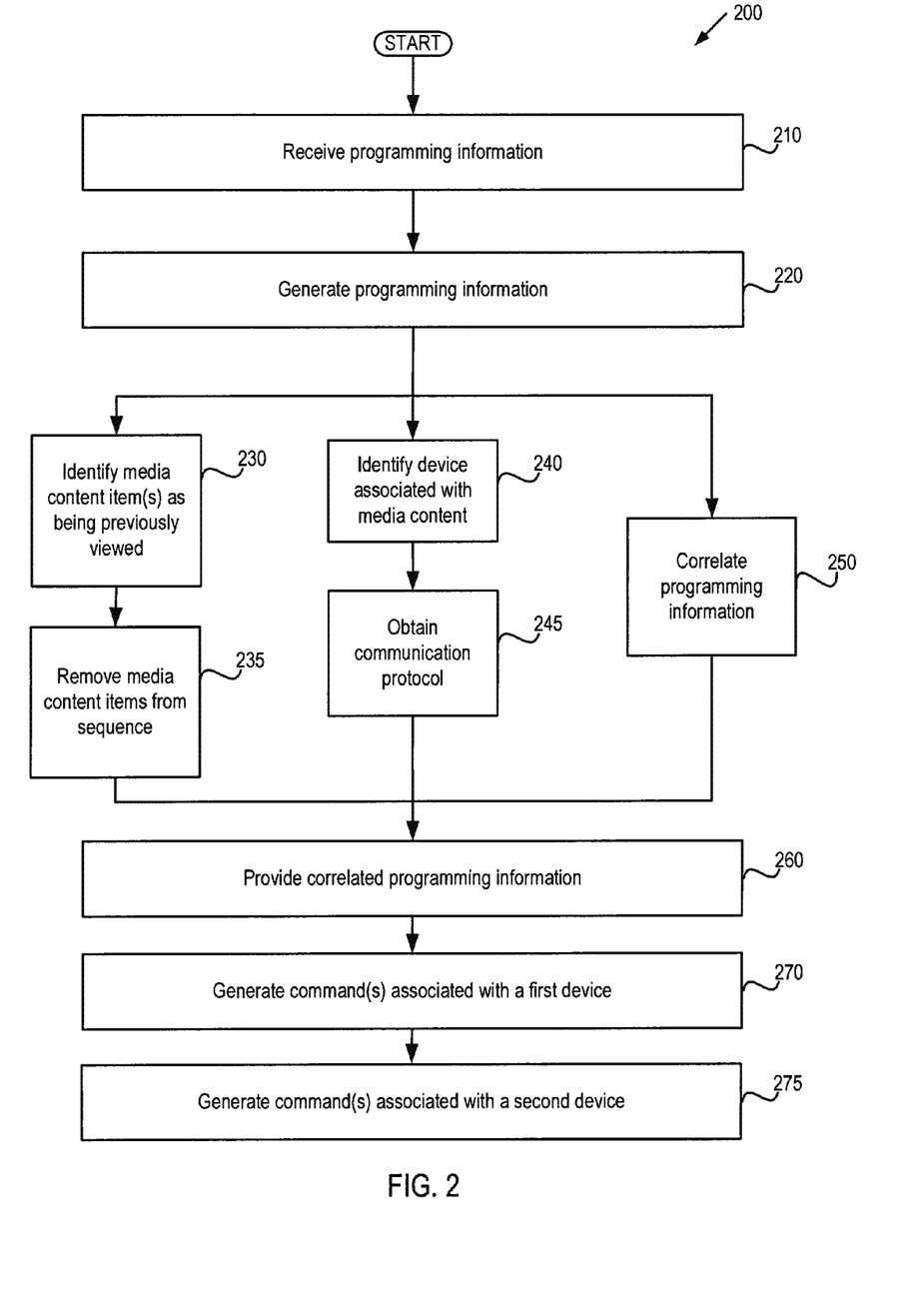
FIG. 2 depicts a flow diagram of aspects of a method for providing correlated programming information for broadcast media content and streaming media content.

FIG. 2 depicts a flow diagram of aspects of a method 200 for providing correlated programming information for broadcast media content and streaming media content. The method is performed by processing logic that may comprise hardware (circuitry, dedicated logic, etc.), software (such as is run on a general purpose computer system or a dedicated machine), or a combination of both. In one implementation, the method is performed by the user device 101 of FIG. 1, while in some other implementations, one or more blocks of FIG. 2 may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, first programming information is received. In certain implementations, the first programming information can include scheduling information for media content, such as media content originating at a first source. Examples of such media content include but are not limited to broadcast media such as broadcast television, radio, etc., originating from or otherwise being provided by a broadcast source such as broadcast TV 120 via one or more networks 105A such as cable networks, satellite networks, terrestrial networks, etc. Moreover, examples of such first programming information can include but are not limited to scheduling information for various media content (e.g., broadcast TV programs) provided by EPG server 160 and/or third party EPG data provider 165.

Figure 3A:
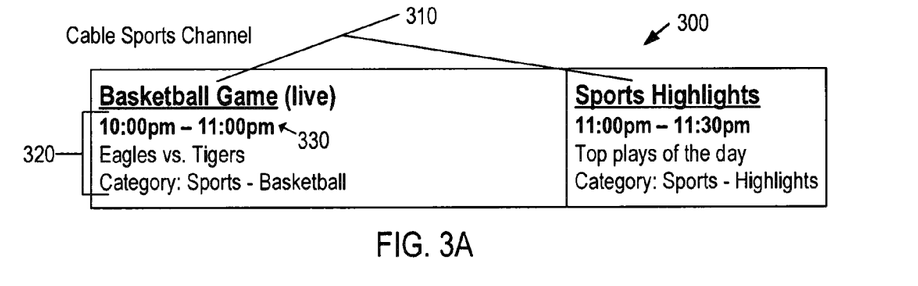
FIGS. 3A-D depict various schematic diagrams showing various types of media content, in accordance with various implementations of the present disclosure.

For example, FIG. 3A depicts a schematic diagram 300 showing media content 310 (broadcast TV programs, such as 'Basketball Game' and 'Sports Highlights') provided in a broadcast TV channel ('Cable Sports Channel'). Each media content item 310 can be associated with programming information 320, such as program description (e.g., 'Eagles vs. Tigers'), category (e.g., 'Sports—Basketball') and scheduling information 330 (e.g., '10:00 pm-11:00 pm'). In one aspect, block 210 is performed using program list cache 142.

At block 220, programming information is generated. In certain implementations, such programming information can be second programming information and can be generated based on media content originating at a second source. Examples of such media content include but are not limited to streaming media such as streaming video and/or audio content items (and/or sequences of such items, such as a playlist of multiple video clips or audio clips), originating from or otherwise provided by streaming media server(s) 130 via a network 105C such as the Internet. Accordingly, based on such media content (e.g., streaming media content such as one or more videos) and/or information associated with such media content (e.g., a duration of one or more streaming content items, as can be stored, for example, at streaming metadata servers 170), second programming information (that is, programming information associated with such streaming media content items) can be generated. That is, it can be appreciated that, in contrast to broadcast media (e.g., TV programs which have a fixed broadcast time), streaming media can be provided at any time, upon request of the user. As such, in certain implementations, the duration of one or more streaming media content items can be processed in relation to a particular time of day (e.g., a present time) to generate programming information that reflects respective times at which such streaming media content items can be presented in a sequential, broadcast-like channel. In doing so, programming information such as scheduling information that is comparable and/or in a comparable format to the scheduling information associated with the broadcast media content referenced at block 210 can be generated. In one aspect, block 220 is performed using program list cache 142.

Figure 3B:
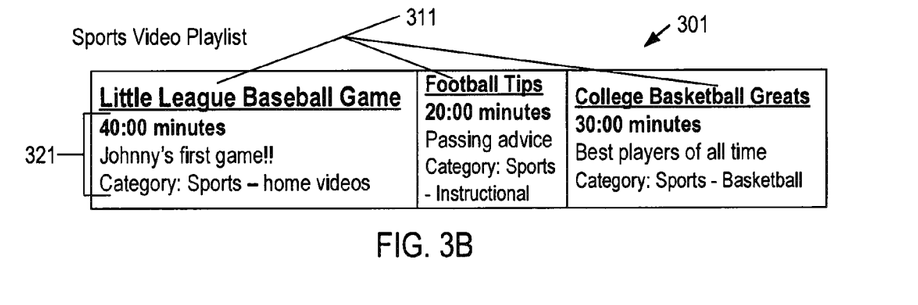
Figure 3C:
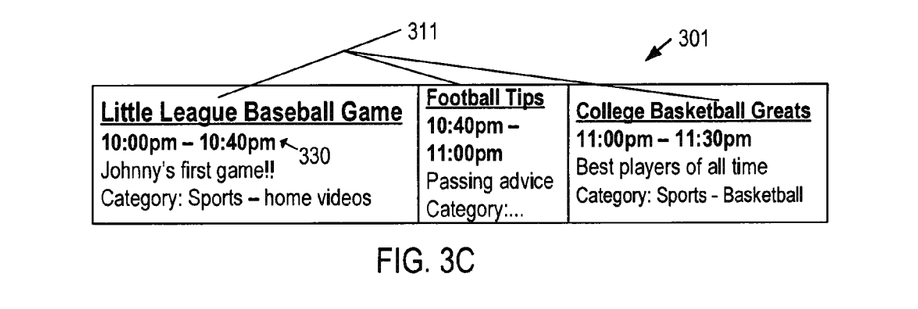
Figure 3D:
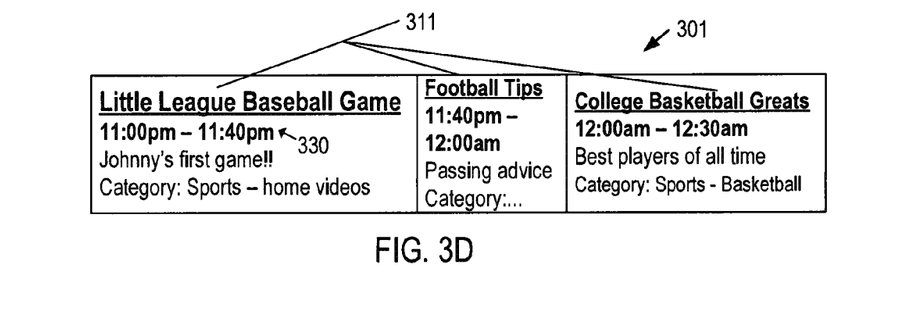

For example, FIG. 3B depicts a schematic diagram 301 showing media content 311 (streaming media videos, such as 'Little League Baseball Game,' 'Football Tips,' etc.) that make up a streaming video playlist ('Sports Video Playlist'). Each media content item 311 can be associated with programming information 321, such as video description (e.g., 'Johnny's first game!!'), category (e.g., 'Sports—home videos) and duration (e.g., '40:00 minutes'). It can be appreciated that the respective durations of the media content items 311 in the playlist can be processed relative to a present time (e.g., 10:00 pm), and, in doing so, scheduling information 330 (e.g., '10:00 pm-10:40 pm') can be generated and associated with the respective media content items 311, as shown in FIG. 3C. It should also be noted that scheduling information 330 can be generated any number of times and/or on a constant or ongoing basis, such that the scheduling information is update in accordance with the passage of time. Thus, for example, in certain implementations the scheduling information generated for media content items 311 (if they are not viewed by the user) can be updated as time passes, as shown in FIG. 3D (depicting the same media content items 311 as shown in FIG. 3C, updated for a present time of 11:00 pm).

Additionally, in certain implementations the media content originating at a second source can include media content associated with a user, such as media content (e.g., video content items or playlists) subscribed to by the user (such as a user associated with user device 101). Such media content can include media content not previously viewed by the user, as identified, for example, based on a media playback history for the user, as can be stored at user preference server 180.

At block 230, one or more of the media content items can be identified as being previously viewed by a user. For example, the media playback history of a particular user (as stored, for example, at user preference server 180) can be queried or searched in relation to one or more media content items, such as videos in a playlist. In one aspect, block 230 is performed by program list cache 142.

At block 235, the one or more of the media content items can be removed from the sequence. For example, having identified (such as at block 230) that one or more of the media content items (e.g. videos within a playlist) have been previously viewed by a user, such media content items can be removed or otherwise omitted from the sequence. By way of illustration and with reference to FIG. 3C, based on an identification that a user associated with user device 101 has previously viewed the 'Little League Baseball Game' video, this video can be removed from the playlist/sequence, which can begin, instead, from the next video in the list. In one aspect, block 235 is performed by program list cache 142.

At block 240, a device associated with the media content originating at a first source and/or the media content originating at a second source can be identified. For example, TVs, STBs, and/or or any other devices such as media projection devices (e.g., audio equipment) that are connected to or otherwise accessible from a network (such as local network 105B) can be identified. Moreover, in certain implementations, characteristics and/or capabilities of such devices can be identified. In certain implementations, any number of device discovery techniques can be utilized such as Simple Service Discovery Protocol (SSDP), Discover and Launch (DIAL), etc. In one aspect, block 240 is performed by TV/STB capability detector 145.

At block 245, a communication protocol associated with the device can be obtained. For example, having identified (such as at 240) a particular device (and/or characteristics and/or capabilities of such a device), a protocol-file for the identified device/characteristic can be requested or otherwise obtained (such as from TV/STB protocol server 150). In one aspect, block 245 is performed by TV/STB protocol fetcher 144.

At block 250, the second programming information can be correlated with the first programming information. That is, having generated (such as at block 220) programming information (such as scheduling information) for streaming media content, such programming information can be correlated with other programming information (such as comparable scheduling information spanning the same or a similar time period) for broadcast media content (such as the programming information received at block 210). In doing so, the programming information (such as scheduling information) can be presented, such as at UI 148, in a relatively uniform format, thereby enabling a user to select from both broadcast media and streaming media within a single interface. In one aspect, block 250 is performed by program list cache 142.

Moreover, in certain implementations one or more similarities between the media content originating at a first source and the media content originating at the second source can be identified. That is, it can be appreciated that both broadcast media content (e.g., TV programs) and streaming media content (e.g., streaming videos) can be associated with various information/details such as categories, program descriptions, ratings, etc. (as can be stored, for example, at EPG server 160 and streaming media metadata servers 170, respectively). As such, such respective associated information can be processed or otherwise analyzed to identify similarities between broadcast media content and streaming media content.

Figure 4:
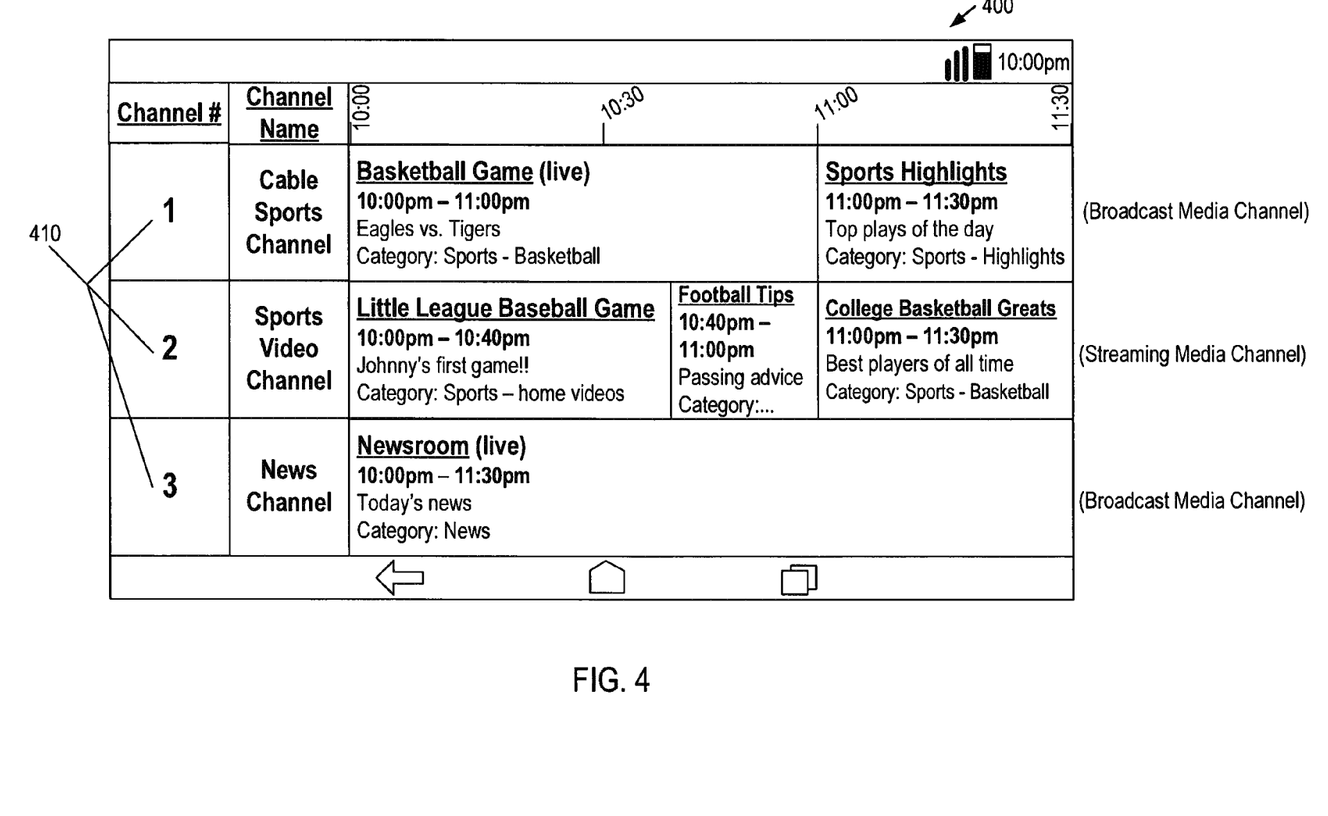
FIG. 4 depicts an example interface showing broadcast channel programming information and streaming channel programming information, in accordance with one implementation of the present disclosure.

At block 260, the first programming information and the second programming information as correlated with the first programming information can be provided at an interface. For example, FIG. 4 depicts an example interface 400 showing programming information for broadcast channels (e.g., channels 1 and 3), as well as programming information for a streaming channel (channel 2) as correlated with the programming information of the broadcast channels. For example, as depicted in FIG. 4, the programming information for the streaming media content can be aligned with that of the broadcast media content, thereby depicting the streaming media content in a comparable manner to that of the broadcast media content. In one aspect, block 260 is performed by UI 148.

Moreover, in certain implementations, the second programming information can be arranged in relation to the first programming information. For example, having determined that the media content provided in a streaming media channel (e.g., 'Sports Video Channel') is comparable or similar to the media content provided in a broadcast media channel (e.g., 'Cable Sports Channel'), such as based on an analysis of information/details associated with the respective media content items (as referenced above), such channels can be juxtaposed or otherwise arranged in relation to one another, such as is depicted in FIG. 4.

Additionally, in certain implementations a respective identifier can be assigned to each of the first programming information and the second programming information. For example, as shown in FIG. 4, channel identifiers 410 (e.g., numbers or any other such identifiers) can be assigned to various channels (broadcast media channels and streaming media channels). In doing so, by navigating through a sequence of channels, a user can transition between broadcast media channels and streaming media channels. Moreover, in certain implementations the referenced identifiers can be assigned based on an identified similarity between the content of the respective channels. For example, broadcast media channels and streaming media channels having common characteristics or similarities can be grouped (as identified, for example, in the manner referenced above) in a numeric channel sequence (such as is depicted in FIG. 4 where the 'Cable Sports Chanel' is assigned channel identifier '1' while 'Sports Video Channel' is assigned channel identifier '2'). In doing so, a user can navigate through a sequence of channels (including both broadcast media channels and streaming media channels) having common or related content. It should also be noted that in scenarios where various channels are so grouped, other channels may be renumbered (i.e., may be assigned alternative or replacement identifiers) to account for such grouping.

In yet other implementations, composite programming information can be provided. Such composite programming information can include one or more segments of the first programming information and one or more segments of the second programming information. That is, it can be appreciated that both broadcast media channels and streaming media channels can include various media content items (programs, videos, etc.), some of which are of interested to a viewer and others of which are not. Accordingly, in certain implementations, composite programming information can be generated, such as with respect to a particular category or interest of a particular user. For example, it can be appreciated with reference to FIG. 4 that a user only interested in viewing programming relating to basketball will, at times, need to transition from channel 1 ('Cable Sports Chanel') to channel 2 ('Sports Video Channel') if the user is to only view basketball-related media. Accordingly, in certain implementations, a composite channel (reflecting the composite programming information of multiple channels, both broadcast media channels and streaming media channels) can be provided. Such a composite channel can provide a single sequence of media content which is a composite of both broadcast media content and streaming media content.

Figure 5:
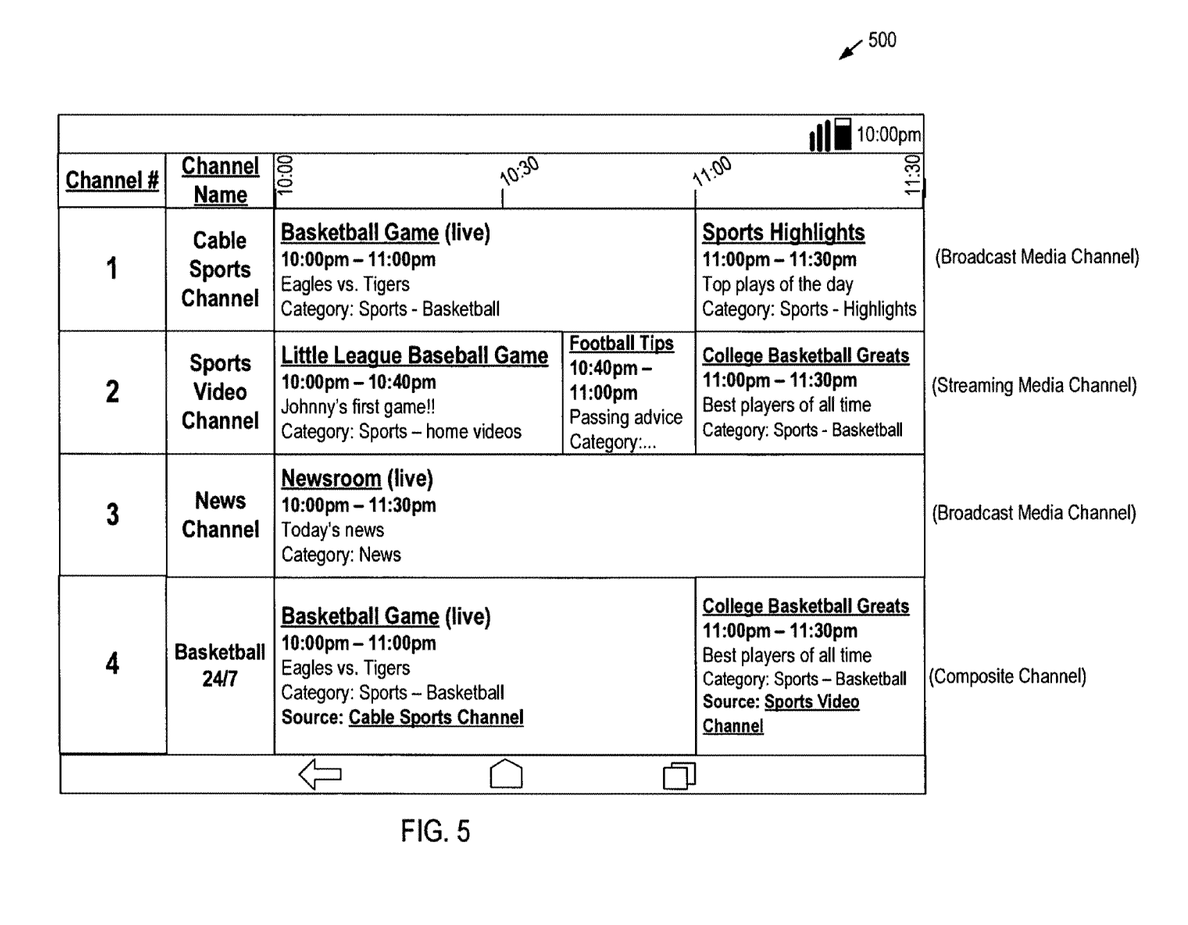
FIG. 5 depicts an example interface including a composite channel, in accordance with one implementation of the present disclosure.

By way of illustration, FIG. 5 depicts an interface 500 including a composite channel (channel 4—'Basketball 24/7'). It can be appreciated (such as with reference to channels 1 and 2 as shown in FIG. 5) that the composite channel incorporates programming from both broadcast media channels (e.g., channel 1) and streaming media channels (e.g., channel 2). In selecting such a composite channel, a user can view media content (whether from broadcast or streaming sources) that is directed to a particular interest, characteristic, etc., without the need to transition between channels. It should be noted that, in certain implementations, the composite programming information can incorporate an attribution to the source channel of each respective media content item (program, video, etc.). For example, as shown in FIG. 5, each media content item can include an indication of its source (e.g., 'Cable Sports Channel' and 'Sports Video Channel').

At block 270, a command associated with a first device can be generated. In certain implementations, such a command can be generated based on a selection of the media content originating at a first source. For example, upon receiving a selection of a channel or media content item at UI 148, TV/STB controller 146 can generate and/or transmit a corresponding command to one or more devices (e.g., TV/STB 110), such as in a manner described in detail above. In one aspect, block 270 is performed by TV/STB controller 146.

At block 275, a command associated with a second device can be generated. In certain implementations, such a command can be generated based on a selection of the media content originating at a second source. For example, upon receiving a selection of a channel or media content item at UI 148, media controller 147 can generate and/or transmit a corresponding command, such as in a manner described in detail above. In one aspect, block 275 is performed by media controller 147.

Figure 6:
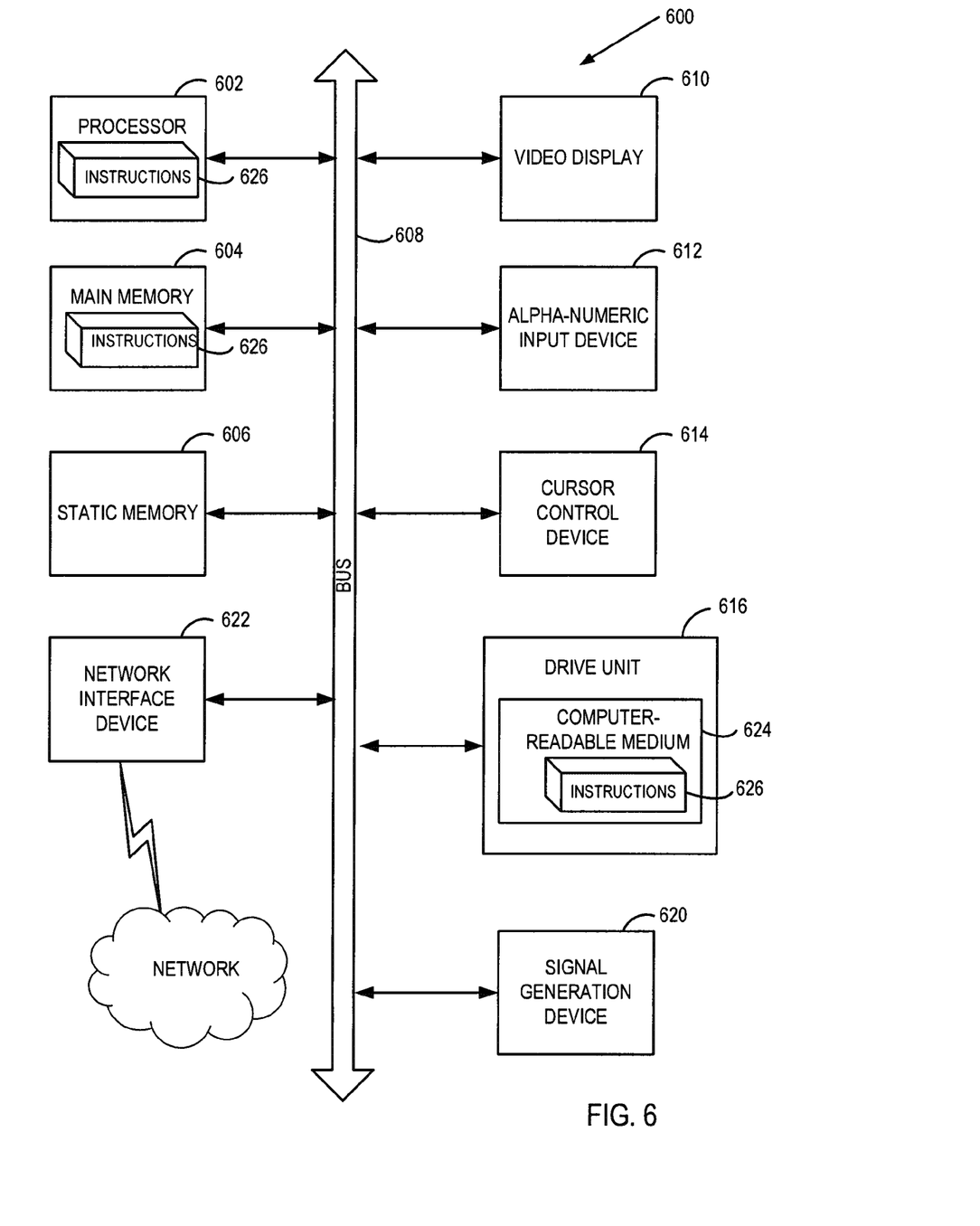
FIG. 6 depicts a block diagram of an illustrative computer system operating in accordance with aspects and implementations of the present disclosure.

FIG. 6 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "correlating," "providing," "identifying," "removing," "obtaining," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
    receiving first programming information, the first programming information comprising scheduling information for media content originating at a first source;
    generating, with a processing device and based on a duration of media content originating at a second source and a current time, second programming information, the second programming information comprising scheduling information for the media content originating at the second source;
    correlating the second programming information with the first programming information, wherein correlating the second programming information comprises correlating scheduling information for a media content item originating at the second source with the first programming information based on a duration of the media content item; and
    providing, at an interface and in relation to the current time, (a) the first programming information and (b) the second programming information as correlated with the first programming information.

2. The method of claim 1, further comprising:
    based on a selection of the media content originating at a first source, generating a command associated with a first device; and
    based on a selection of the media content originating at a second source, generating a command associated with a second device.

3. The method of claim 1, wherein the media content originating at a second source comprises media content associated with a user.

4. The method of claim 3, wherein the media content originating at a second source comprises media content not previously viewed by the user.

5. The method of claim 1, wherein the media content originating at a second source comprises a sequence of media content items.

6. The method of claim 5, further comprising:
identifying one or more of the media content items as being previously viewed by a user; and
removing the one or more of the media content items from the sequence.

7. The method of claim 1, further comprising:
identifying a device associated with at least one of the media content originating at a first source or the media content originating at a second source; and
obtaining a communication protocol associated with the device.

8. The method of claim 1, wherein correlating the second programming information with the first programming information comprises identifying one or more similarities between the media content originating at a first source and the media content originating at the second source.

9. The method of claim 1, wherein providing (a) the first programming information and (b) the second programming information as correlated with the first programming information comprises arranging the second programming information in relation to the first programming information.

10. The method of claim 1, wherein providing (a) the first programming information and (b) the second programming information as correlated with the first programming information comprises assigning a respective identifier to each of the first programming information and the second programming information.

11. The method of claim 1, wherein providing (a) the first programming information and (b) the second programming information as correlated with the first programming information comprises providing composite programming information, the composite programming information comprising (a) at least a segment of the first programming information and (b) at least a segment of the second programming information.

12. The method of claim 1, wherein correlating the second programming information with the first programming information comprises correlating the second programming information with the first programming information in relation to the duration of the media content originating at the second source and a duration of the media content originating at the first source.

13. A system comprising:
a memory; and
a processing device, coupled to the memory, to:
receive first programming information, the first programming information comprising scheduling information for media content originating at a first source;
generate, based on a duration of media content originating at a second source and a current time, second programming information, the second programming information comprising scheduling information for the media content originating at the second source;
correlate the second programming information with the first programming information, wherein to correlate the second programming information is to correlate scheduling information for a media content item originating at the second source with the first programming information based on a duration of the media content item; and
provide, at an interface and in relation to the current time, (a) the first programming information and (b) the second programming information as correlated with the first programming information.

14. The system of claim 13, wherein the processing device is further to:
generate, based on a selection of the media content originating at a first source, a command associated with a first device; and
generate, based on a selection of the media content originating at a second source, a command associated with a second device.

15. The system of claim 13, wherein to correlate the second programming information with the first programming information the processing device is to identify one or more similarities between the media content originating at a first source and the media content originating at the second source.

16. The system of claim 13, wherein to provide (a) the first programming information and (b) the second programming information as correlated with the first programming information the processing device is to arrange the second programming information in relation to the first programming information.

17. The system of claim 13, wherein to provide (a) the first programming information and (b) the second programming information as correlated with the first programming information the processing device is to assign a respective identifier to each of the first programming information and the second programming information.

18. The system of claim 13, wherein to provide (a) the first programming information and (b) the second programming information as correlated with the first programming information the processing device is to provide composite programming information, the composite programming information comprising (a) at least a segment of the first programming information and (b) at least a segment of the second programming information.

19. A non-transitory computer readable medium having instructions stored thereon that, when executed by a processor, cause the processor to:
receive first programming information, the first programming information comprising scheduling information for media content originating at a first source;
generate, based on a duration of media content originating at a second source and a current time, second programming information, the second programming information comprising scheduling information for the media content originating at the second source;
correlate, by the processor, the second programming information with the first programming information, wherein to correlate the second programming information the processor is to correlate scheduling information for a media content item originating at the second source with the first programming information based on a duration of the media content item; and
provide, at an interface and in relation to the current time, (a) the first programming information and (b) the second programming information as correlated with the first programming information.

* * * * *